July 29, 1930.  G. DUESLER  1,771,488
SPRING SUSPENSION FOR SIX-WHEEL VEHICLES
Filed June 12, 1929  2 Sheets-Sheet 1
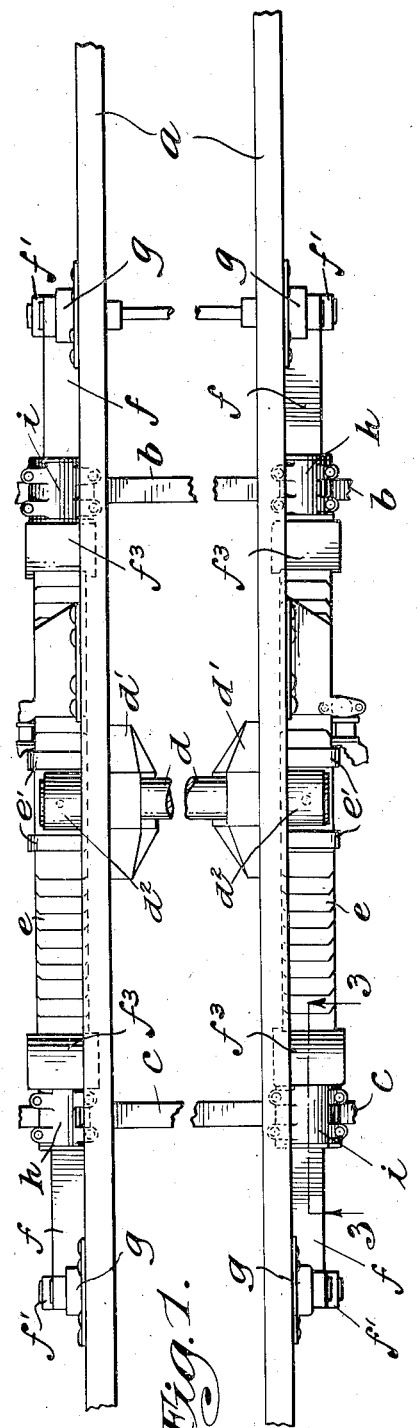
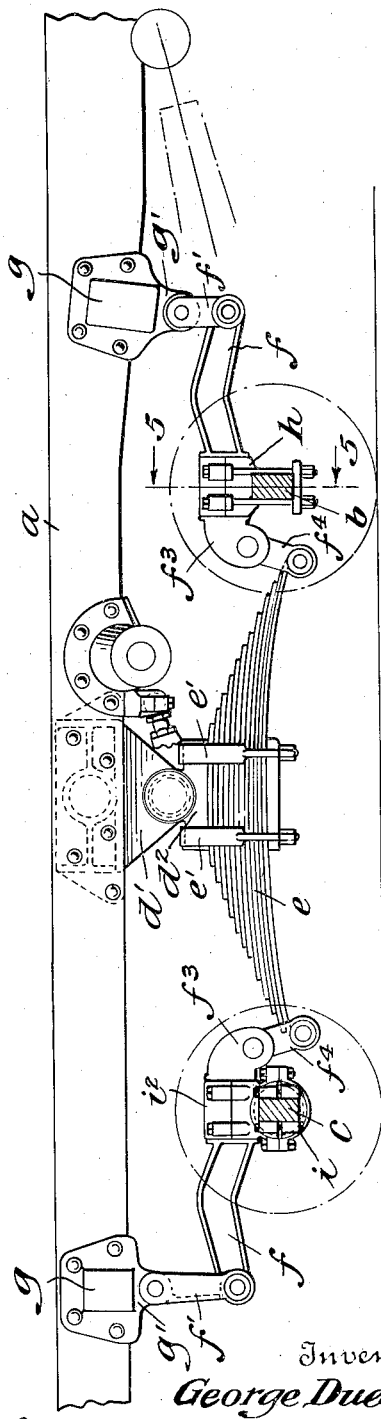
Inventor:
George Duesler
By his Attorneys
Redding, Greeley, O'Shea & Campbell July 29, 1930.  G. DUESLER  1,771,488
SPRING SUSPENSION FOR SIX-WHEEL VEHICLES
Filed June 12, 1929  2 Sheets-Sheet 2
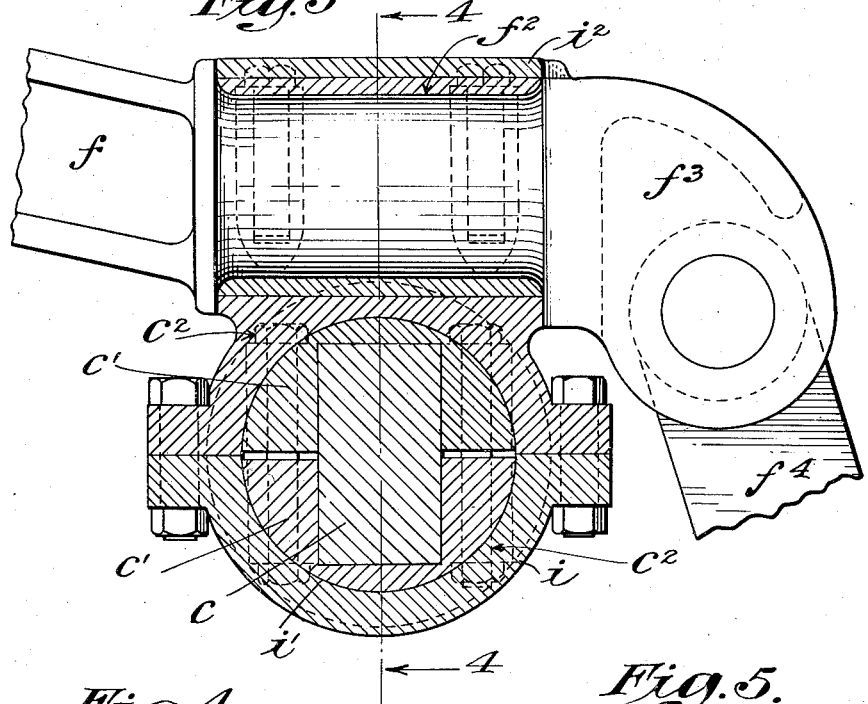
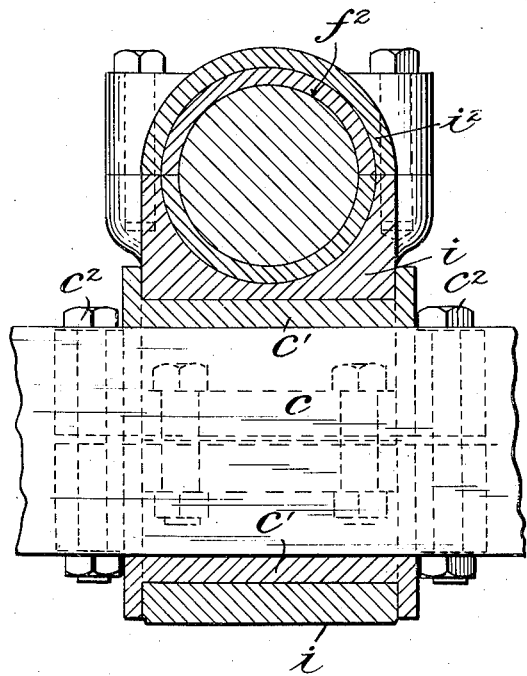
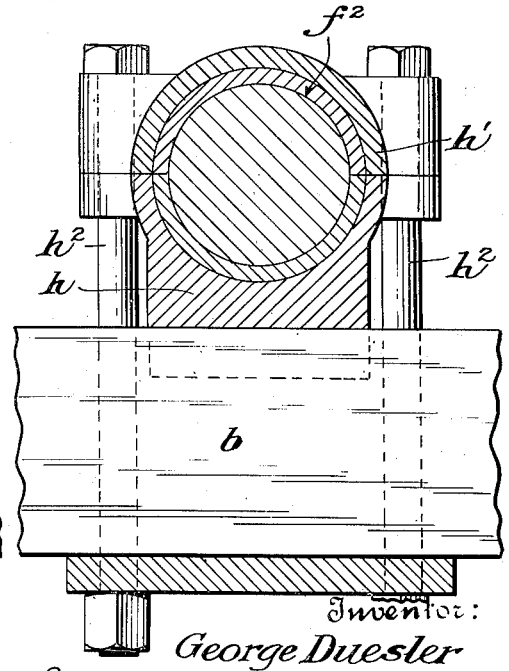
Inventor:
George Duesler Patented July 29, 1930

1,771,488

UNITED STATES PATENT OFFICE

GEORGE DUESLER, OF GLENDALE, CALIFORNIA, ASSIGNOR TO INTERNATIONAL MOTOR COMPANY, OF NEW YORK, N. Y., A CORPORATION OF DELAWARE

SPRING SUSPENSION FOR SIX-WHEEL VEHICLES

Application filed June 12, 1929. Serial No. 370,207.

The present invention relates to spring suspensions for vehicles and embodies, more specifically, an improved form of spring suspension in which capacity for movement of each wheel independently of the other is afforded without impressing undue stresses and strains upon the axles and related supporting mechanisms.

It is common knowledge that, in a spring suspension wherein four wheels are connected together to form a unit mounting for one end of the frame, one wheel frequently is elevated or depressed with respect to the others. Since the wheels are mounted on axles which extend transversely of the frame such change of position of a wheel causes the inclination of the axle to vary with respect to the horizontal. The movement necessary to assume such inclination is about the relatively stationary wheel and thus causes a twisting of the spring supporting such moving wheel in order that the leaves at the end of the spring connected to such wheel will lie in the same plane as the axle.

This twisting of the spring is quite undesirable and the present invention provides a construction in which the spring is relieved from such twisting forces and permitted to deflect in one plane only, that is, a vertical plane. The mounting of the spring and its connection to the axles, therefore, constitutes an improved construction which not only accomplishes the above object but serves to afford a highly serviceable type of suspension which enables a maximum amount of flexibility to be obtained without impairing the strength of the connections.

An object of the invention, therefore, is to provide a spring suspension which permits relative movement of one wheel with respect to the others without impressing deleterious stresses upon the springs and associated connecting elements.

A further object of the invention is to provide an improved form of spring suspension of the above character in which the elements thereof are simple in construction and effective in operation to provide a maximum amount of flexibility together with maximum strength of spring mounting.

Further objects of the invention will be apparent as it is described in greater detail in connection with the accompanying drawings wherein:

Figure 1 is a plan view showing a spring mounting constructed in accordance with the present invention.

Figure 2 is a view in elevation showing the spring mounting illustrated in Figure 1.

Figure 3 is a view in section, taken on line 3—3 of Figure 1, and looking in the direction of the arrows.

Figure 4 is a view in sections, taken on line 4—4 of Figure 3, and looking in the direction of the arrows.

Figure 5 is a view in section, taken on line 5—5 of Figure 2, and looking in the direction of the arrows.

Referring to the above drawings, $a$ designates the side frame member of the vehicle chassis having front and rear dual axles $b$ and $c$, respectively. An anchor tube $d$ is carried in brackets $d'$ which mount the tube on the frame and blocks $d^2$ are rotatably mounted upon the anchor tubes.

Springs $e$ are secured to the blocks by suitable straps $e'$ and thus are rotatably mounted with respect to the frame about the anchor tube as a center. Supporting arms or brackets $f$ mount the axles between the ends of the springs $e$ and the frame through suitable shackles in the following manner. Front and rear brackets $g$ are secured to the frame and provided with shoulders $g'$ to which links $f'$ are connected. These links are pivoted to the ends of brackets $f$ and the shoulders $g'$ of the brackets $g$ and thus permit fore and aft movement of the brackets $f$ with respect to the frame. Cylindrical bearing surfaces $f^2$ are formed on the brackets $f$ and extensions $f^3$ are connected to the ends of the springs $e$ by links $f^4$.

One end of each axle is rigidly secured to a bracket $h$, as shown in Figure 5, the bracket $h$ being formed with a two part journal $h'$ for receiving the cylindrical bearing $f^2$ of the brackets $f$. The bracket $h$ may be clamped to the axle by bolts $h^2$ or may be secured in any equivalent fashion and the above described connection permits pivotal movement of the axle about one end without setting up twisting stresses in the spring secured to the axle at the other end. This is true since the pivotal movement of the axle with respect to the spring is accommodated by relative movement of the bearing surfaces $f^2$ and $h'$.

The ends of each axle opposite to those rigidly secured to the brackets $h$ are mounted in brackets $i$, as clearly shown in Figures 2, 3 and 4. For example, the end of axle $c$, adjacent to the bracket $h$, secured to axle $b$ is provided with cooperating cylindrical bearings $c'$ which are clamped upon the axle by means of bolts $c^2$. Brackets $i$ are formed with journal bearings $i'$ and are received over the cylindrical bearings $c'$ to permit rotative movement of brackets $i$ about the axles in a fore and aft direction. The brackets $i$ are formed with journals $i^2$, similar to the journals $h'$ on the brackets $h$ and, in this manner, support the corresponding brackets $f$ as previously described.

The diagonally opposed ends of the front and rear axles are mounted in similarly formed journaled brackets, thus permitting each axle to assume any desired angle with respect to the other without impressing upon the spring or any associated connecting elements, deleterious stresses incident to such movement. While the invention has been described with specific reference to the constructions shown in the accompanying drawings, it is obvious that the design and the arrangement of parts may be varied to suit individual requirements and the invention is not to be limited, save as defined in the appended claims.

I claim as my invention:

1. In a spring suspension, a plurality of axles, springs between the axles adjacent either ends thereof, means to mount springs rotatably on the frame, a bearing fixedly secured to one end of each of the axles, such ends being on opposite sides of the frame, other bearings mounted at the other ends of the axles with provision for rotative movement about the axes of the axles, supporting means connected between the frame and the ends of the springs, and means to journal the supporting means in the respective bearings.

2. In a spring suspension, a plurality of axles, springs between the axles adjacent either ends thereof, means to mount the springs rotatably on the frame, a bearing fixedly secured to one end of one of the axles, a supporting means connected between the frame and one end of the spring, means to journal the supporting means in the bearing, a second bearing on the adjacent end of the other axle, means to mount the second bearing with capacity for rotative movement about the axis of the second axle, a second supporting means connected between the frame and the other end of the spring, and means to journal the second supporting means in the second bearing.

3. In a spring suspension for a plurality of axles, a spring, means to mount the spring rotatably on the frame, longitudinal bearings secured to the axles, supporting means between the frame and the ends of the spring, shackle connections between the ends of the supporting means and the spring and frame, and means to journal the supporting means in the bearings.

4. In a spring suspension for a plurality of axles, a spring, means to mount the spring rotatably on the frame, longitudinal bearings secured to the axles, supporting means connected between the frame and the ends of the springs, and means to journal the supporting means in the bearings.

5. In a spring suspension for a plurality of axles, a spring, means to mount the spring rotatably on the frame between the axles, longitudinal bearings on each axle, means to mount one of the bearings fixedly to an axle, means to journal another bearing about the axis of another axle, supporting means connected to the springs, and means to journal the supporting means in the longitudinal bearings.

6. In a spring suspension for a plurality of axles, a spring, longitudinal bearings on each axle, means to mount one of the bearings fixedly to an axle, means to journal another bearing about the axis of another axle, supporting means connected between the frame and the ends of the spring, and means to journal the supporting means in the longitudinal bearings.

This specification signed this 5 day of June A. D. 1929.

GEORGE DUESLER.